US011679558B2

United States Patent
Mizokuchi (10) Patent No.: US 11,679,558 B2
(45) Date of Patent: Jun. 20, 2023

(54) OPTICAL FORMING DEVICE, FORMING METHOD, AND THREE-DIMENSIONAL OBJECT

(71) Applicant: TIANMA JAPAN, LTD., Kanagawa (JP)

(72) Inventor: Chikaaki Mizokuchi, Kanagawa (JP)

(73) Assignee: TIANMA JAPAN, LTD, Kanagawa (JP)

( * ) Notice: Subject to any disclaimer, the term of this patent is extended or adjusted under 35 U.S.C. 154(b) by 18 days.

(21) Appl. No.: 17/111,962

(22) Filed: Dec. 4, 2020

(65) Prior Publication Data
US 2021/0178684 A1 Jun. 17, 2021

(30) Foreign Application Priority Data
Dec. 12, 2019 (JP) .............................. JP2019-224423

(51) Int. Cl.
B29C 64/295 (2017.01)
B33Y 30/00 (2015.01)
B29C 35/00 (2006.01)
C08F 2/46 (2006.01)
B29C 35/08 (2006.01)

(52) U.S. Cl.
CPC ........ B29C 64/295 (2017.08); B29C 35/0805 (2013.01); C08F 2/46 (2013.01)

(58) Field of Classification Search
CPC ... B29C 64/295; B29C 64/255; B29C 64/286; B29C 64/129; B29C 64/20; B29C 35/0805; C08F 2/46; B33Y 10/00; B33Y 30/00
See application file for complete search history.

(56) References Cited

U.S. PATENT DOCUMENTS

2009/0184444 A1* 7/2009 Honda ................... B33Y 40/00
264/401
2020/0055251 A1* 2/2020 Medalsy ................. B29C 64/20

FOREIGN PATENT DOCUMENTS

JP 2009-137049 A 6/2009

OTHER PUBLICATIONS

Van et al. ("Polarization-selective polymerization in a photocrosslinking monomer film" RSC Adv., 2014, 4, 62499) (Year: 2014).*

* cited by examiner

Primary Examiner — Joseph S Del Sole
Assistant Examiner — Baileigh Kate Darnell
(74) Attorney, Agent, or Firm — Sughrue Mion, PLLC (57) ABSTRACT

An optical forming device includes a resin tank that is to retain a photocurable resin containing dichroic polymerization initiator and a light emitter to emit light for causing the photocurable resin to undergo curing. An alignment film for causing the dichroic polymerization initiator to align in a predetermined direction is provided on a bottom portion of the resin tank. The light emitter irradiates the photocurable resin with the light by passing the light through the bottom portion of the resin tank as linearly polarized light having a polarization direction in a direction perpendicular to a direction in which the dichroic polymerization initiator is aligned by the alignment film.

10 Claims, 10 Drawing Sheets

OPTICAL FORMING DEVICE, FORMING METHOD, AND THREE-DIMENSIONAL OBJECT

FIELD

This application relates to an optical forming device, a forming method, and a three-dimensional object.

BACKGROUND

Techniques for forming a three-dimensional object by irradiating a photocurable resin with light via a bottom of a container retaining the photocurable resin are known. When the photocurable resin is irradiated with the light via the bottom of the container, there is risk of cured photocurable resin adhering to the bottom of the container. To address this, methods for removing the photocurable resin from the bottom of the container have been proposed.

For example, Unexamined Japanese Patent Application Publication No. 2009-137049 discloses an optical forming device to form a three-dimensional model by (i) forming a cured layer between a constraining window and a movement table by emitting light via the constraining window and (ii) stacking the cured layers. With this optical forming device, the formed cured layer is removed from the constraining window by moving the movement table in a direction perpendicular to the surface of the photocurable resin.

In Unexamined Japanese Patent Application Publication No. 2009-137049, after the cured layer adhering to the constraining window is removed, the movement table is moved to a position for forming the next cured layer and then the cured layer is formed. Therefore, the throughput in manufacturing the three-dimensional object drops.

SUMMARY

An optical forming device in a first aspect of the present disclosure includes:
  a resin tank to retain a photocurable resin including a dichroic polymerization initiator; and
  a light emitter to irradiate the photocurable resin with light for causing the photocurable resin to undergo curing, wherein
  a bottom portion of the resin tank is provided with an alignment film for causing the dichroic polymerization initiator to align in a predetermined direction, and
  the light emitter irradiates the photocurable resin with the light by passing the light through the bottom portion of the resin tank as linearly polarized light having a polarization direction in a direction perpendicular to a direction in which the dichroic polymerization initiator is aligned by the alignment film.

A method for forming a three-dimensional object in a second aspect of the present disclosure, the method including:
  irradiating a photocurable resin including a dichroic polymerization initiator aligned by an alignment film with linearly polarized light having a polarization direction in a direction perpendicular to a direction in which the dichroic polymerization initiator is aligned by the alignment film, thereby causing the photocurable resin to undergo curing; and
  moving the cured photocurable resin in an emission direction of the linearly polarized light.

A three-dimensional object in a third aspect of the present disclosure formed from photocurable resin that is cured, the photocurable resin including dichroic polymerization initiator.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, an optical forming device according to the embodiments is described with reference to the drawings.

Embodiment 1

An optical forming device 100 according to the present embodiment is described with reference to FIG. 1 to FIG. 5. The optical forming device 100 forms a three-dimensional object Ob from a photocurable resin RL containing a dichroic polymerization initiator.

Figure 1:
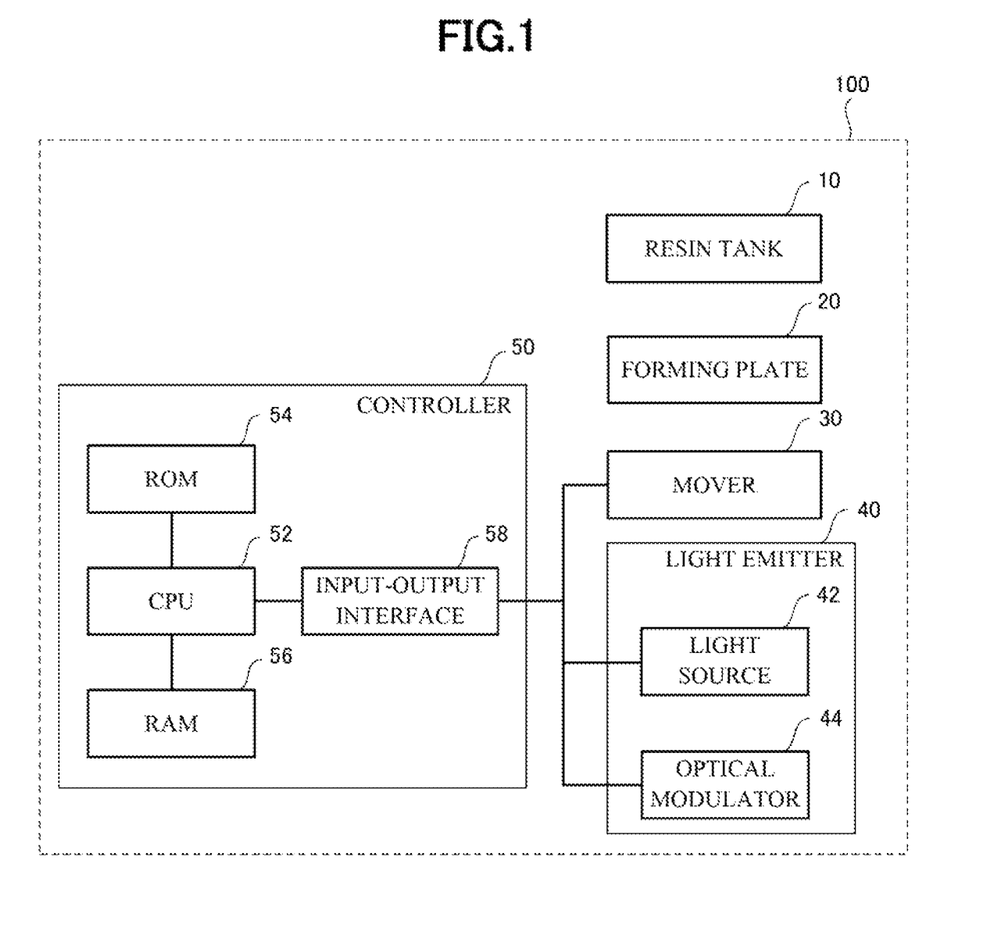
FIG. 1 is a diagram illustrating a configuration of an optical forming device according to Embodiment 1.
Figure 2:
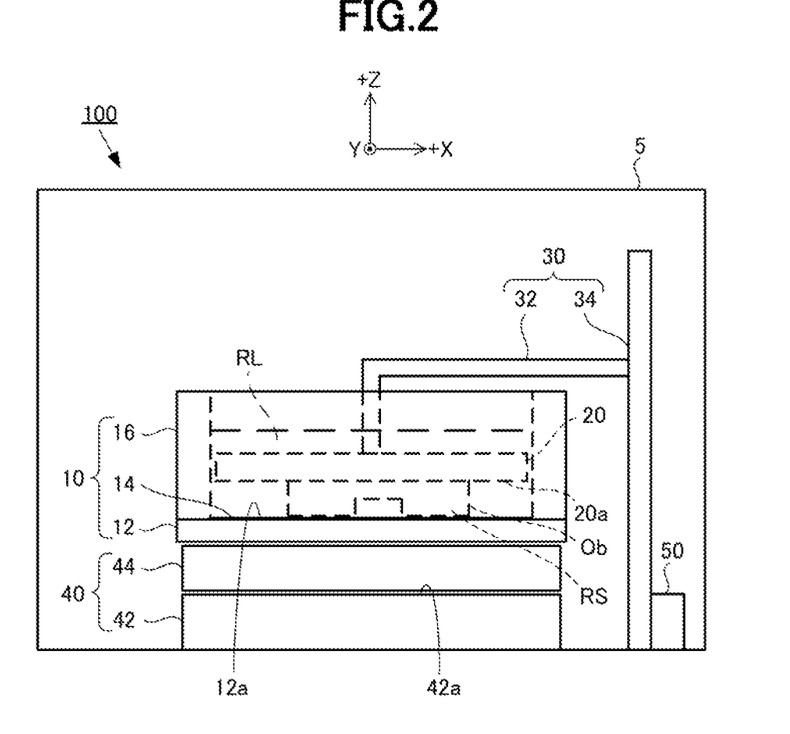
FIG. 2 is a schematic diagram illustrating the optical forming device according to Embodiment 1.

The optical forming device 100, as illustrated in FIG. 1 and FIG. 2, includes a resin tank 10, a forming plate 20, a mover 30, a light emitter 40, and a controller 50, all being housed within a housing 5 of the optical forming device 100. The resin tank 10 retains the photocurable resin RL containing the dichroic polymerization initiator. The three-dimensional object Ob is formed on a surface 20a of the forming plate 20. The mover 30 causes the forming plate 20 to move. The light emitter 40 emits light, for causing the photocurable resin RL containing the dichroic polymerization to undergo curing, toward the photocurable resin RL containing the dichroic polymerization initiator. The controller 50 controls each component of the optical forming device 100.

In the present disclosure, in order to facilitate understanding, the longitudinal right direction (the direction toward the right of FIG. 2) of the optical forming device 100 in FIG. 2 is defined as +X direction, the upward direction (direction toward the top of FIG. 2) is defined as +Z direction, and the direction perpendicular to the +X and +Z directions (the direction toward the front of FIG. 2) is defined as +Y direction. There are instances where the photocurable resin RL containing the dichroic polymerization initiator is referred to as the photocurable resin RL.

The resin tank 10 of the optical forming device 100, as illustrated in FIG. 2, retains the photocurable resin RL. The resin tank 10 is a box-shaped container having an opening at the +Z side surface. The resin tank 10 includes a bottom portion 12, an alignment film 14, and a wall portion 16. The alignment film 14 causes the dichroic polymerization initiator included in the photocurable resin RL to align in a predetermined direction.

Here, the photocurable resin RL to be retained in the resin tank 10 is described. The photocurable resin RL is a resin that cures by being irradiated with light of a predetermined wavelength. A cured photocurable resin RS is formed when the photocurable resin RL is irradiated with the light of the predetermined wavelength. In the present embodiment, the photocurable resin RL is an ultraviolet (UV) curable-type resin. Preferably, the photocurable resin RL has liquid crystallinity.

Figure 3:
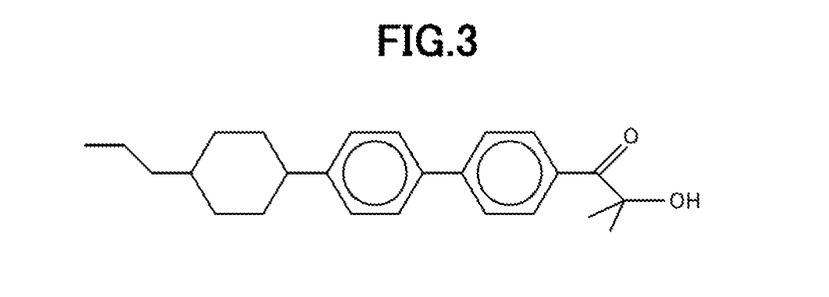
FIG. 3 is a diagram illustrating an example of a dichroic polymerization initiator according to Embodiment 1.

The photocurable resin RL includes a dichroic polymerization initiator, monomers, oligomers, and the like. The dichroic polymerization initiator absorbs light (UV light) for causing the photocurable resin RL to undergo curing to generate active species of radicals, ions, and the like, causing a polymerization reaction in the monomers, oligomers, and the like to begin. The term "dichroic" means that there is a difference between absorption intensities of two beams of linearly polarized light in a material in a case where the material is irradiated with the two beams of linearly polarized light having polarization directions perpendicular to each other. In the dichroic polymerization initiator of the present embodiment, the absorption intensity of the beam of linearly polarized light having a polarization direction parallel to the direction of alignment by the alignment film 14 (molecular major axis of the dichroic polymerization initiator) is great, whereas the absorption intensity of the beam of linearly polarized light having a polarization direction that is perpendicular to the direction of alignment by the alignment film 14 is small. Liquid crystalline polymerization initiator such as that illustrated in FIG. 3 is an example of dichroic polymerization initiator. The concentration of the dichroic polymerization initiator is less than or equal to 10% by weight. In the embodiments below, dielectric anisotropy is described as being positive.

Preferably, the monomers and oligomers included in the photocurable resin RL have liquid crystallinity. Preferably, the photocurable resin RL contains at least one of a liquid crystalline monomer or a liquid crystalline oligomer.

The bottom portion 12 of the resin tank 10 enables light (UV light), for causing the liquid photocurable resin RL to undergo curing, emitted from the light emitter 40 to pass therethrough. The bottom portion 12 is a flat plate of glass, for example. As illustrated in FIG. 2, the alignment film 14 is provided on an inner surface 12a of the bottom portion 12.

The alignment film 14 of the resin tank 10 is provided on the inner surface 12a of the bottom portion 12. The alignment film 14 through anchoring force causes the dichroic polymerization initiator (molecular major axis of the dichroic polymerization initiator) to be aligned in a predetermined direction. Also, in a case where the photocurable resin RL has liquid crystallinity, the alignment film 14 causes the photocurable resin RL to be aligned in a predetermined direction.

In the present embodiment, the alignment film 14 is a horizontal alignment film for causing the dichroic polymerization initiator to be aligned in the Y direction. The alignment film 14 is, for example, a photoisomerization-type photoalignment film. The photoisomerization-type photoalignment film is formed by irradiating an alignment film material that causes an isomerization action with linearly polarized light. The alignment film material that causes the isomerization action is applied to the inner surface 12a of the bottom portion 12. Since the photoisomerization-type photoalignment film has a high resistance against light (UV light), the durability of the resin tank 10 can be improved by using the photoisomerization-type photoalignment film as the alignment film 14.

The wall portion 16 of the resin tank 10 blocks light from curing the photocurable resin RL. The wall portion 16 is formed of resin, metal, and the like. The wall portion 16 and the bottom portion 12 of the resin tank 10 are separably formed.

The forming plate 20 of the optical forming device 100 is a flat plate made of resin or made of metal. The forming plate 20 is placed on the +Z side with respect to the bottom portion 12 of the resin tank 10. Also, in the initial state of the optical forming device 100, the forming plate 20 is positioned within the resin tank 10 (initial position of the forming plate 20). The forming plate 20 forms a three-dimensional object Ob on the surface 20a facing the bottom portion 12 of the resin tank 10. The forming plate 20 is moved by the mover 30 in the +Z direction and the −Z direction.

The mover 30 of the optical forming device 100 causes the forming plate 20 to move in the +Z direction and the −Z direction. The mover 30 includes an arm 32 and a moving mechanism 34. The arm 32 of the mover 30 connects the forming plate 20 and the moving mechanism 34. The moving mechanism 34 of the mover 30 causes the moving plate 20 to move in the +Z direction and the −Z direction via the arm 32. The moving mechanism 34 is equipped with a motor, a ball screw, a slider, and so on (not illustrated).

The light emitter 40 of the optical forming device 100 irradiates the photocurable resin RL with light (UV light) for causing the photocurable resin RL to undergo curing. The light emitter 40 irradiates the photocurable resin RL with light for causing the photocurable resin RL to undergo curing as linearly polarized light having a polarization direction in a direction perpendicular to the direction in which the dichroic polymerization initiator is aligned by the alignment film 14. The light emitter 40 is equipped with a light source 42 and an optical modulator 44. Below, there are cases where the direction in which the dichroic polymerization initiator is aligned by the alignment film 14 is described as the alignment direction of the dichroic polymerization initiator by the alignment film 14.

The light source 42 of the light emitter 40 emits, toward the liquid photocurable resin RL, light (UV light) for causing the photocurable resin RL to undergo curing. In the present embodiment, the light source 42 is placed on the −Z-side with respect to the resin tank 10. The light source 42 emits, from a top surface 42a positioned on the resin tank 10-side, light, which is non-polarized light and is for causing the photocurable resin RL to undergo curing, in the +Z direction. The light source 42 is equipped with a reflective sheet, a light emitting diode (LED) that emits light for causing the photocurable resin RL to undergo curing, a diffusion sheet, and the like.

The optical modulator 44 of the light emitter 40 modulates light (UV light), which is for causing the photocurable resin RL to undergo curing and is emitted from the light source 42, in a pattern based on a cross-sectional shape of the three-dimensional object Ob. Also, the optical modulator 44 enables the modulated light to pass through the bottom portion 12 of the resin tank 10 as linearly polarized light, irradiating the photocurable resin RL in a pattern corresponding to the cross-sectional shape of the three-dimensional object Ob. The polarization direction of the linearly polarized light emitted from the optical modulator 44 is perpendicular to the alignment direction of the dichroic polymerization initiator by the alignment film 14.

Specifically, the optical modulator 44 is a liquid crystal device placed between the resin tank 10 and the light source 42. The liquid crystal device is an active matrix-driven twisted nematic (TN)-type liquid crystal device and has multiple liquid crystal cells. The liquid crystal cells are arrayed into a matrix. The liquid crystal cells either block or enable passage therethrough of light that causes the photocurable resin RL to undergo curing. The liquid crystal device modulates, based on cross-sectional shape data indicating a shape of a cross-section perpendicular to the +Z direction of the three-dimensional object Ob, light, for causing the photocurable resin RL to undergo curing in a pattern based on the cross-sectional shape of the three-dimensional object Ob. Then, the liquid crystal device emits the light, for causing the photocurable resin RL to undergo curing in a pattern corresponding to the cross-sectional shape of the three-dimensional object Ob, as linearly polarized light having a polarization direction (X direction) that is perpendicular to the alignment direction (Y direction) of the dichroic polymerization initiator by the alignment film 14.

Here, the curing of the photocurable resin RL is described.

Figure 4:
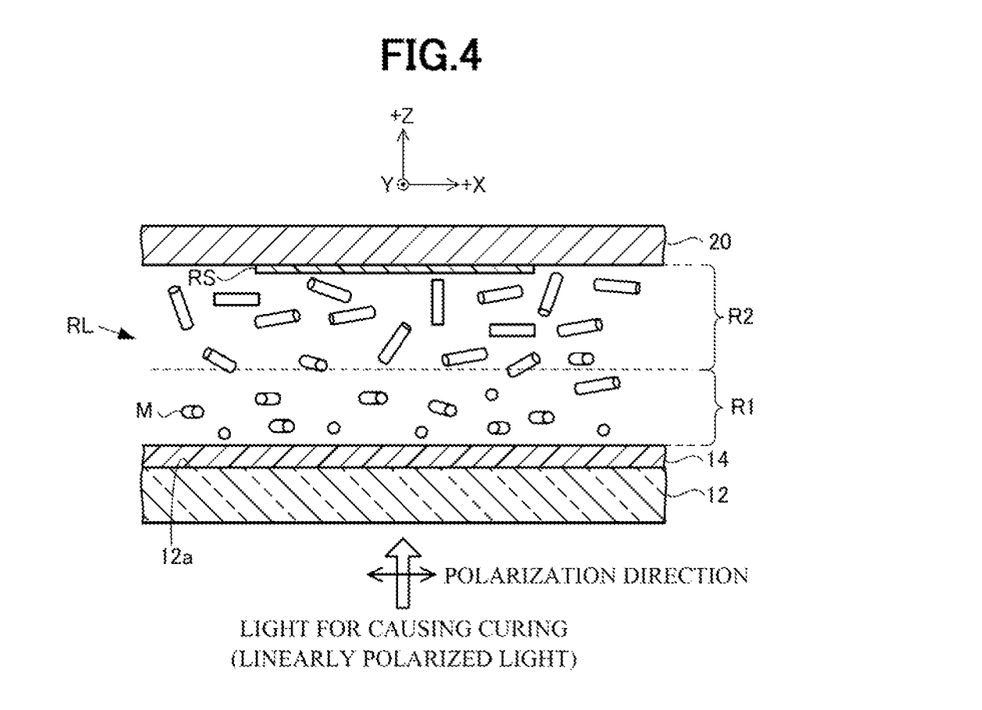
FIG. 4 is a schematic diagram illustrating formation of a cured photocurable resin according to Embodiment 1.

In the present embodiment, the alignment film 14 for causing the dichroic polymerization initiator to align in a predetermined direction (Y direction) is provided on the inner surface 12a of the bottom portion 12. Therefore, in the photocurable resin RL retained in the resin tank 10, molecules M of the dichroic polymerization initiator in region R1 are aligned in the predetermined direction (Y direction) as illustrated in FIG. 4 because region R1 is adjacent to the alignment film 14, that is, because region R1 is a region in which the anchoring force of the alignment film 14 acts upon the molecules M therein. Conversely, molecules M of the dichroic polymerization initiator in region R2 face random directions because region R2 is distant from the alignment film 14, that is, because region R2 is a region in which the anchoring force of the alignment film 14 does not act upon the molecules M therein.

In the present embodiment, the photocurable resin RL in such a state is irradiated with the light (UV light) for causing the photocurable resin RL to undergo curing, as linearly polarized light having the polarization direction (X direction) that is perpendicular to the alignment direction (Y direction) of the dichroic polymerization initiator by the alignment film 14. In region R2 that is distant from the alignment film 14, since the molecules M of the dichroic polymerization initiator facing either the polarization direction (X direction) or a direction close to the polarization direction absorb the light for causing the photocurable resin RL to undergo curing, the photocurable resin RL cures quickly. Therefore, the layer of the cured photocurable resin RS is formed upon the surface 20a of the forming plate 20 positioned in region R2 distant from the alignment film 14.

Conversely, in region R1 adjacent to the alignment film 14, since the molecules M of the dichroic polymerization initiator facing either the alignment direction (Y direction) or a direction close to the alignment direction absorb almost no light for causing the photocurable resin RL to undergo curing, almost no cured photocurable resin RS is formed. Hence, in the present embodiment the cured photocurable resin RS can be prevented or suppressed from adhering to the bottom portion 12. The thickness of region R1 adjacent to the alignment film 14, which is the region in which anchoring force of the alignment film 14 acts upon the molecules M therein, generally is less than or equal to 0.5 µm.

Referring back to FIG. 1, the controller 50 of the optical forming device 100 controls the mover 30 and the light emitter 40. Also, the controller 50 generates cross-sectional shape data indicating the shape of the cross-section perpendicular to the +Z direction of the three-dimensional object Ob based on the three-dimensional shape data indicating the three-dimensional shape of the three-dimensional object Ob. The cross-sectional shape data indicating the shape of a cross-section perpendicular to the +Z direction is generated at a predetermined interval in the +Z direction.

The controller 50, as illustrated in FIG. 1, includes a central processing unit (CPU) 52 for executing each of the types of processing, a read-only memory (ROM) 54 for preliminarily storing programs and data, a random-access memory (RAM) 56, and an input-output interface 58 for inputting and outputting signals between components. The functions of the controller 50 are achieved by execution of the programs stored in the ROM 54 by the CPU 52. The input-output interface 58 inputs and outputs signals between the CPU 52, the mover 30, the light emitter 40, and a non-illustrated external device.

Next, a method for forming the three-dimensional object Ob is described with reference to FIG. 5. In the present embodiment, the three-dimensional object Ob is formed by stacking n-layers of a cured photocurable resin RS by the optical forming device 100.

Figure 5:
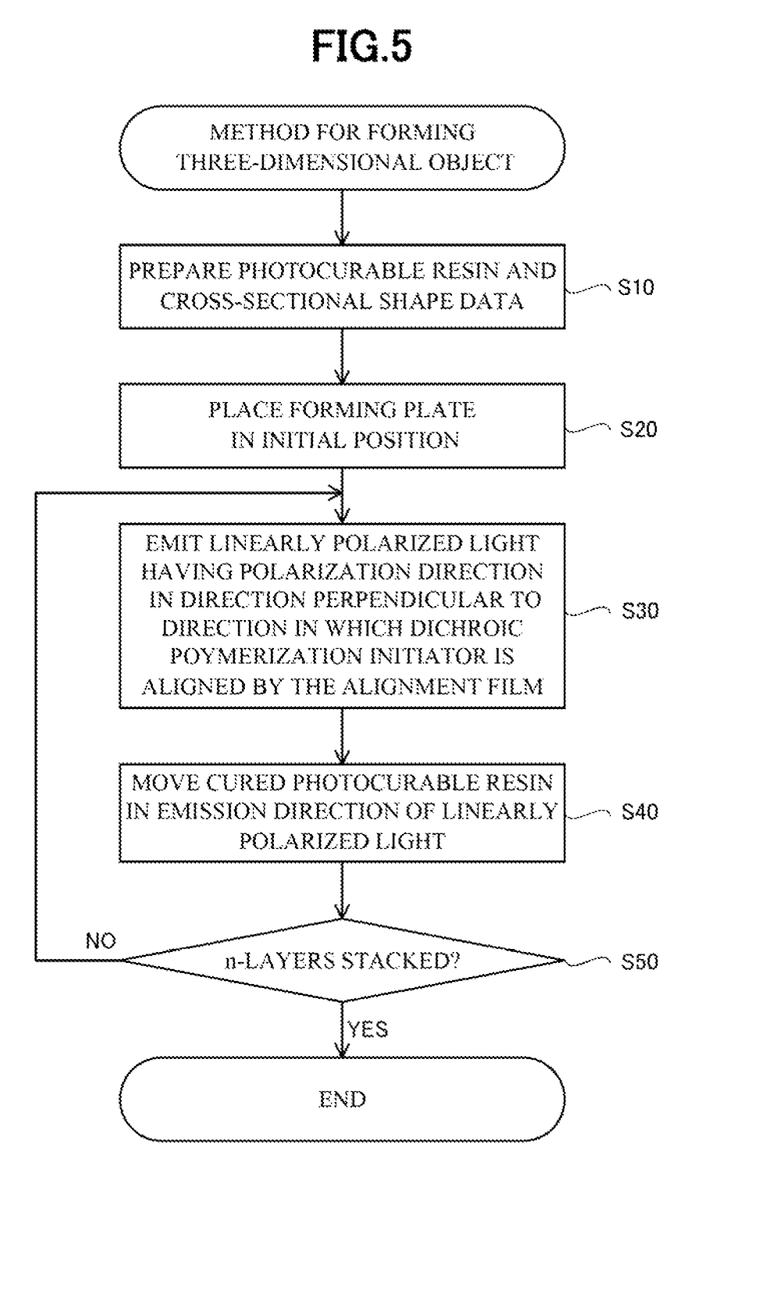
FIG. 5 is a flowchart illustrating a method for forming a three-dimensional object according to Embodiment 1.

FIG. 5 is a flowchart illustrating the method for forming the three-dimensional object Ob. The method for forming the three-dimensional object Ob includes a step of preparing a photocurable resin RL and cross-sectional shape data (step S10), a step of placing the forming plate 20 in an initial position (step S20), a step of causing the photocurable resin RL to undergo curing by irradiating the photocurable resin RL containing dichroic polymerization initiator aligned by the alignment film 14 with linearly polarized light having a polarization direction in a direction perpendicular to the direction in which the dichroic polymerization initiator is aligned by the alignment film 14 (step S30), a step of moving the cured photocurable rein RS in the emission direction of the linearly polarized light (step S40), and a step of determining whether or not the layers of the cured photocurable resin RS are equal to n-layers stacked (step S50). In the present embodiment, step S30 and step S40 are repeated.

In step S10, the photocurable resin RL for forming the three-dimensional object Ob and the cross-sectional shape data indicating the shape of the cross-section perpendicular to the +Z direction of the three-dimensional object Ob are prepared. In the present embodiment, the photocurable resin RL is a UV curable-type resin containing dichroic polymerization initiator. The cross-sectional shape data is generated by the controller 50 of the optical forming device 100 based on the three-dimensional shape data indicating the three-dimensional shape of a three-dimensional object Ob inputted from an external device. Each piece of the cross-sectional shape data is generated at a predetermined interval in the +Z direction. Each piece of the generated cross-sectional shape data corresponds to a cured photocurable resin RS of n-layers. The three-dimensional data is, for example, three-dimensional computer-aided design (CAD) data of the three-dimensional object Ob.

In the present embodiment, the photocurable resin RL is retained in the resin tank 10 of the optical forming device 100. Since the alignment film 14 is provided on the inner surface 12a of the bottom portion 12 of the resin tank 10, the dichroic polymerization initiator included in the photocurable resin RL is aligned in the predetermined direction (Y direction) by the alignment film 14 in region R1 adjacent to the alignment film 14, that is, the region in which the anchoring force acts upon the molecules M therein. Conversely, the dichroic polymerization initiator faces random directions in region R2 which is distant from the alignment film 14.

In step S20, the forming plate 20 is moved by the mover 30, thereby placing the forming plate 20 in the initial position. Specifically, the surface 20a of the forming plate 20 is placed away from region R1, which is adjacent to the alignment film 14, to the +Z side (that is, region R2 distant from the alignment film 14) only by the thickness (predetermined interval worth) of a layer of the cured photocurable resin RS.

In step S30, UV light is emitted from the light source 42 of the light emitter 40. Then, the optical modulator 44 of the light emitter 40 modulates, based on a single layer of the cross-sectional shape data, the emitted UV light. The photocurable resin RL is irradiated with the modulated light as linearly polarized light having a polarization direction in a direction (X direction) that is perpendicular to the alignment direction (Y direction) of the dichroic polymerization initiator by the alignment film 14. By doing so, in region R2 that is distant from the alignment film 14 and is irradiated with the linearly polarized light (UV light), the dichroic polymerization initiator facing either the polarization direction (X direction) or facing a direction close to the polarization direction absorbs the UV light, and thus the photocurable resin RL cures. In doing so, a single layer of cured photocurable resin RS is formed upon surface 20a of the forming plate 20.

Conversely, in region R1 that is adjacent to the alignment film 14 and irradiated with the linearly polarized light (UV light), the dichroic polymerization initiator facing either the alignment direction (Y direction) or a direction close to the alignment direction absorbs almost no UV light, and thus almost no cured photocurable resin RS is formed. Hence, the cured photocurable resin RS can be prevented or suppressed from adhering to the bottom portion 12 with the forming method of the present embodiment.

In step S40, the cured photocurable resin RS (the forming plate 20) is moved by the mover 30, in the emission direction (+Z direction) of the linearly polarized light (UV), equal to the thickness (predetermined interval worth) of the layer of the cured photocurable resin RS. In the present embodiment, since the cured photocurable resin RS is prevented or suppressed from adhering to the bottom portion 12, a step for removing the cured photocurable resin RS from the bottom portion 12 is unnecessary, and thus the throughput in manufacturing the three-dimensional object Ob can be improved.

In step S50, if the number of times step S30 is executed is less than n-times, a determination is made that the layers of the cured photocurable resin RS are not stacked equal to n-layers (NO in step S50). Upon determining that the layers of the cured photocurable resin RS are not stacked equal to n-layers, forming processing returns processing to step S30, and then a second or subsequent layer of the cured photocurable resin RS is formed. If the number of times step S30 is executed is equal to n-times, a determination is made that the layers of the cured photocurable resin RS are stacked equal to n-layers (YES in step S50), and thus the forming processing ends. As described, the optical forming device 100 can form a three-dimensional object Ob. The cured photocurable resin RS contains a dichroic polymerization initiator. That is, the three-dimensional object Ob is formed of a cured photocurable resin RS containing the dichroic polymerization initiator.

As described above, the optical forming device 100 can prevent or suppress the cured photocurable resin RS from adhering to the bottom portion 12 because the optical forming device 100 irradiates the photocurable resin RL with light, for causing the photocurable resin RL to undergo curing, as linearly polarized light having a polarization direction in a direction perpendicular to the direction in which the dichroic polymerization initiator is aligned by the alignment film 14. Furthermore, since the optical forming device 100 can prevent or suppress the cured photocurable resin RS from adhering to the bottom portion 12, the throughput in forming the three-dimensional object Ob can be improved. Likewise, the method for forming the three-dimensional object Ob of the present embodiment can prevent or suppress the cured photocurable resin RS from adhering to the bottom portion 12, and thus formation throughput can be improved.

Embodiment 2

With the optical forming device 100 of Embodiment 1, the photocurable resin RL is irradiated with light modulated by the optical modulator 44 of the light emitter 40. In the present embodiment, the electrodes that apply a transverse electric field to the photocurable resin RL are provided on the bottom portion 12 of the resin tank 10 of the optical forming device. It is not necessary to provide the optical modulator 44 on the optical forming device 100.

Figure 6:
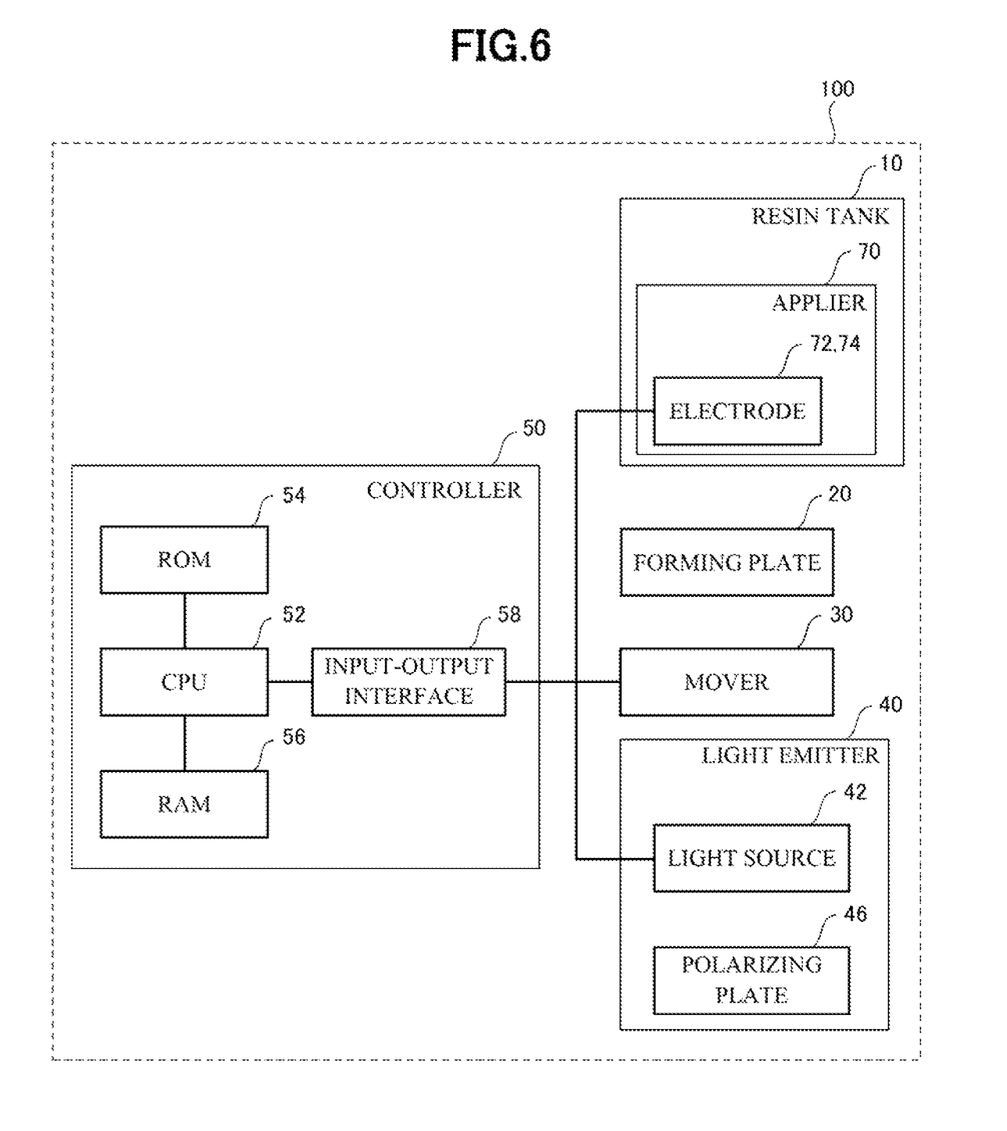
FIG. 6 is a diagram illustrating a configuration of an optical forming device according to Embodiment 2.

The optical forming device 100 according to the present embodiment is described with reference to FIG. 6 to FIG. 12. The optical forming device 100 of the present embodiment, as illustrated in FIG. 6, includes the resin tank 10, the forming plate 20, the mover 30, the light emitter 40, and the controller 50. Since the configuration of the forming plate 20 and the mover 30 of the present embodiment is similar to the configuration of the forming plate 20 and the mover 30 of Embodiment 1, the resin tank 10, the light emitter 40, and the controller 50 are described here.

Figure 7:
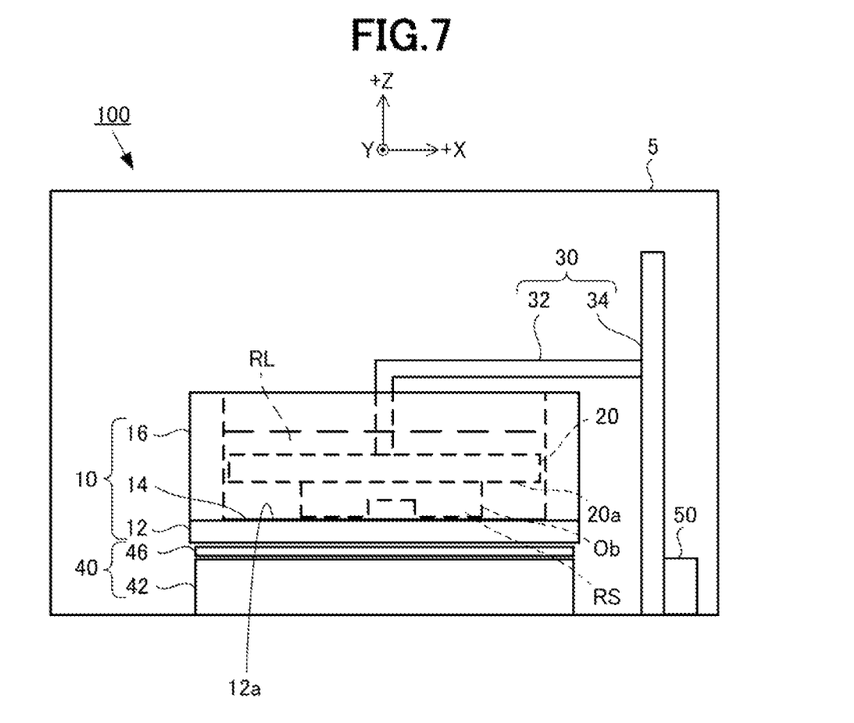
FIG. 7 is a schematic diagram illustrating the optical forming device according to Embodiment 2.
Figure 8:
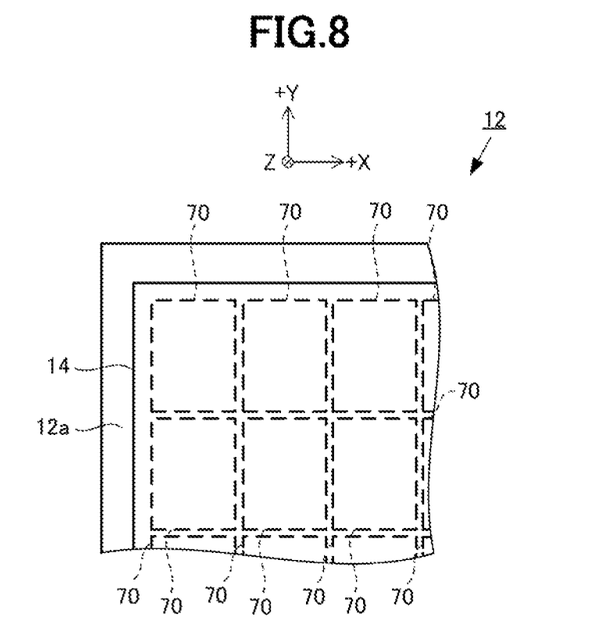
FIG. 8 is a top view of a bottom portion according to Embodiment 2.

The resin tank 10 of the present embodiment, similar to the resin tank 10 of embodiment 1, retains the photocurable resin RL. The resin tank 10 of the present embodiment is a box-shaped container having an opening at the +Z side surface. The resin tank 10 of the present embodiment, as illustrated in FIG. 7, includes the bottom portion 12, the alignment film 14, and the wall portion 16. Furthermore, the resin tank 10 of the present embodiment, as illustrated in FIG. 8, also includes appliers 70 on the inner surface 12a of the bottom portion 12. Since the configuration of the wall portion 16 of the present embodiment is similar to the configuration of the wall portion 16 of Embodiment 1, the bottom portion 12, the alignment film 14, and the applier 70 are described here. The photocurable resin RL to be retained in the resin tank 10 is similar to the photocurable resin RL of Embodiment 1.

The bottom portion 12 of the present embodiment, similar to the bottom portion 12 of Embodiment 1, enables light (UV light), for causing the liquid photocurable resin RL to undergo curing, emitted from the light emitter 40 to pass therethrough. The bottom portion 12 is a flat plate of glass, for example. In the present embodiment, the alignment film 14 and the applier 70 are provided on the inner surface 12a of the bottom portion 12, as illustrated in FIG. 8.

The alignment film 14 of the present embodiment, as illustrated in FIG. 8, covers the applier 70 and the inner surface 12a of the bottom portion 12. Other features of the alignment film 14 are the same as the alignment film 14 of Embodiment 1, and thus the alignment film 14 causes the dichroic polymerization initiator to align in the Y direction.

Figure 9:
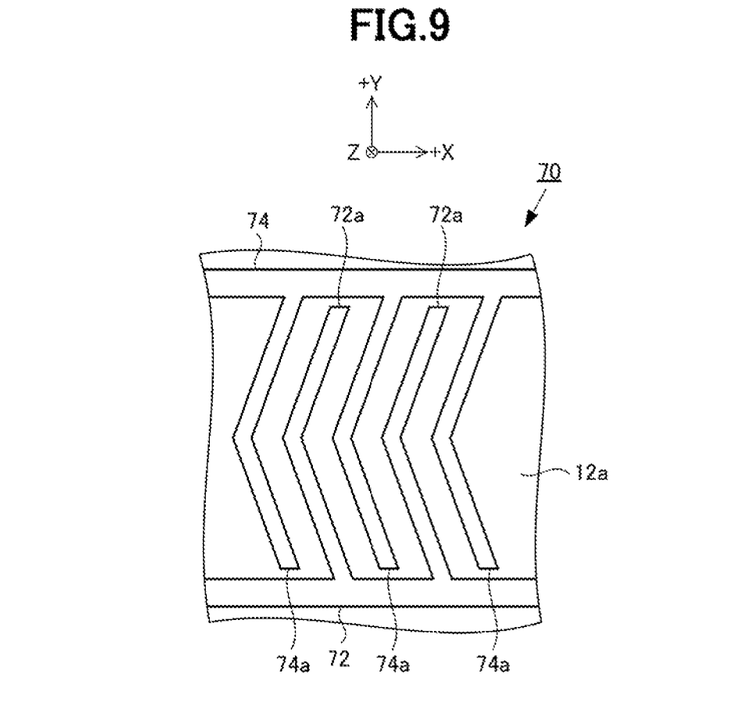
FIG. 9 is a top view of electrodes of an applier according to Embodiment 2.

The applier 70 applies to the photocurable resin RL a transverse electric field in a direction (X direction) perpendicular to the alignment direction (Y direction) of the dichroic polymerization initiator by the alignment film 14 and parallel with the bottom portion 12. The appliers 70, as illustrated in FIG. 8, are placed in a matrix array on the inner surface 12a of the bottom portion 12. The applier 70, as illustrated in FIG. 9 includes electrodes 72 and 74 and a non-illustrated switching device.

The electrodes 72 and 74 of the applier 70 are formed as comb-like teeth from indium tin oxide (ITO), for example. The electrode 72 and the electrode 74 have comb-like teeth portions 72a and 74a, respectively. These comb-like teeth portions 72a and 74a are sideways-V shaped. The comb-like teeth portions 72a and 74a are placed alternatingly and parallel to one another in the X direction. By doing so, a transverse electric field in the X direction and parallel to the bottom portion 12 is generated between the comb-like teeth portion 72a and the comb-like teeth portion 74a. The dichroic polymerization initiator applied with the transverse electric field in the X direction and parallel to the bottom portion 12 aligns in the X direction, that is, in the direction perpendicular to the alignment direction of the dichroic polymerization initiator by the alignment film 14. The switching device of the applier 70 is a transistor (thin film transistor (TFT), for example) for selecting the applier 70 that is to apply a transverse electric field to the photocurable resin RL.

Multiple signal lines, multiple scanning lines, and multiple common lines (none of which are illustrated) are formed on the inner surface 12a of the bottom portion 12. The signal line provides voltage to the electrode 72, whereas the scanning line provides voltage for running the switching device. The applier 70 is surrounded by the signal lines and the scanning lines, and the switching device is provided at the intersecting portion of the scanning lines and the signal lines. The signal line and the electrode 72 are connected via the switching device. Also, the common line provides a common potential to the electrode 74. The signal line, the scanning line and the common line are connected to the controller 50 via a non-illustrated drive circuit.

The light emitter 40 of the present embodiment, similar to the light emitter 40 of Embodiment 1, irradiates the photocurable resin RL with light (UV light) for causing the photocurable resin RL to undergo curing as linearly polarized light having a polarization direction in a direction (X direction) that is perpendicular to the alignment direction (Y direction) of the dichroic polymerization initiator by the alignment film 14. The light emitter 40 of the present embodiment, as illustrated in FIG. 6 and FIG. 7, includes the light source 42 and a polarizing plate 46. The light emitter 40 of the present embodiment does not include the optical modulator 44.

The configuration of the light source 42 of the present embodiment is similar to the light source 42 of Embodiment 1. The polarizing plate 46 emits light (UV light), which is for causing the photocurable resin RL to undergo and is emitted from the light source 42, as linearly polarized light having a polarization direction in a direction (X direction) that is perpendicular to the alignment direction (Y direction) of the dichroic polymerization initiator by the alignment film 14. Below, there are cases where light emitted as linearly polarized light for causing the photocurable resin RL to undergo curing is described as linearly polarized light for causing the photocurable resin RL to undergo curing.

Here, the curing of the photocurable resin RL in the present embodiment is described.

Figure 10:
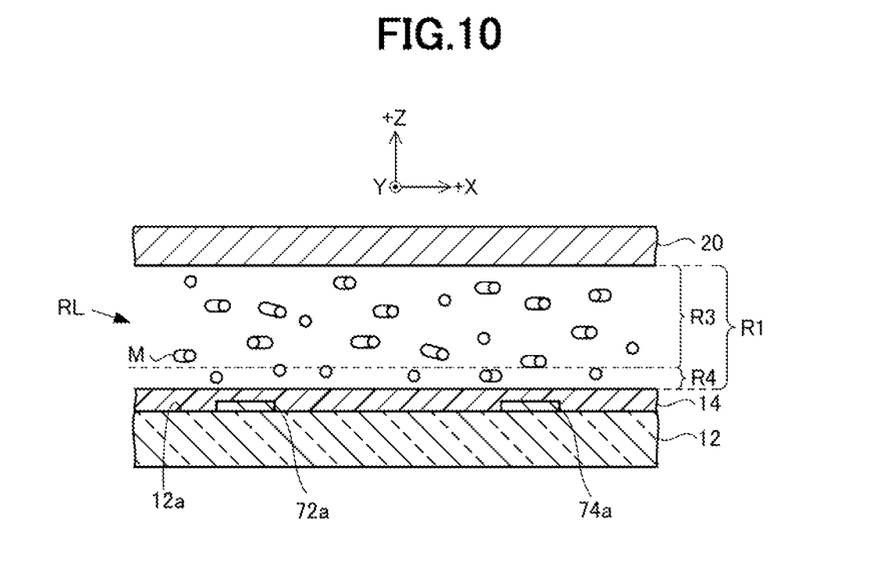
FIG. 10 is a schematic diagram for illustrating a photocurable resin is a state in which a transverse electric field is not applied according to Embodiment 2.

In the present embodiment, the dichroic polymerization initiator is aligned by the alignment film 14 in the Y direction. Therefore, in a state in which the transverse electric field is not applied to the photocurable resin RL, the molecules M of the dichroic polymerization initiator, as illustrated in FIG. 10, are aligned in the Y direction in region R1 adjacent to the alignment film 14, that is, the region in which the anchoring force acts upon the molecules M therein.

Figure 11:
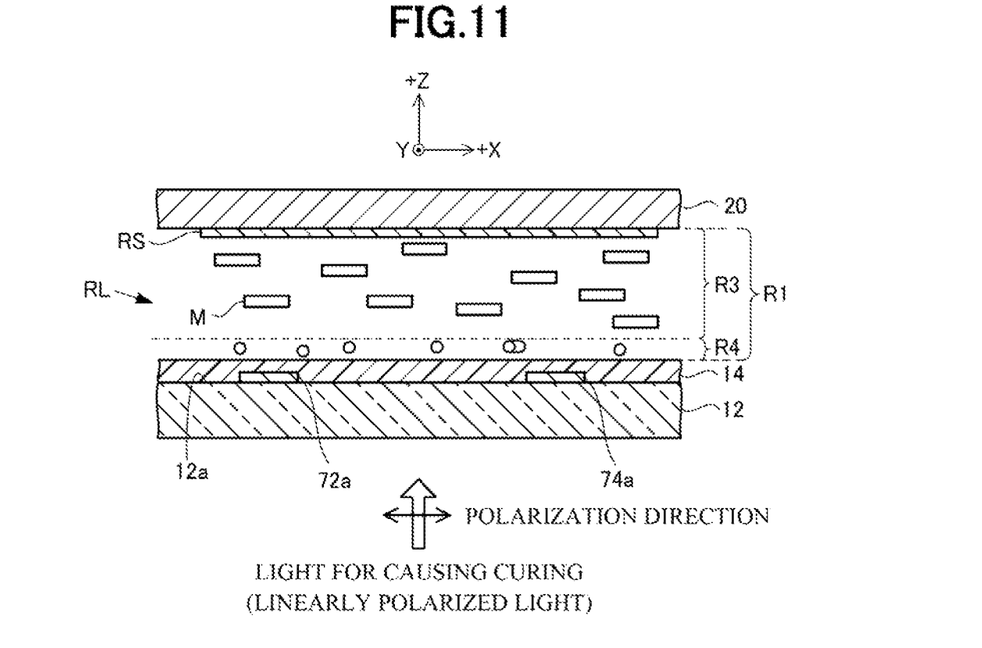
FIG. 11 is a schematic diagram for illustrating the photocurable resin in a state in which the transverse electric field is applied according to Embodiment 2.

Upon applying the transverse electric field in the X direction and parallel to the bottom portion 12 by the comb-like teeth portion 72a of the electrode 72 and the comb-like teeth portion 74a of the electrode 74 to the photocurable resin RL in such a state, the molecules M of the dichroic polymerization initiator rotate in region R3 (excluding region R4 near the surface of the alignment film 14, as to be described hereinafter), having a strong electric field intensity within region R1, rotate 90° on the XY plane, thereby aligning in the X direction, as illustrated in FIG. 11. That is, in region R3 (excluding region R4) having the strong electric field intensity, the transverse electric field in the X direction and parallel to the bottom portion 12 causes the dichroic polymerization initiator to align in the direction (X direction) perpendicular to the alignment direction (Y direction) caused by the alignment film 14. When the photocurable resin RL applied with the transverse electric field is irradiated with the linearly polarized light having a polarization direction in the X direction and for causing the photocurable resin RL to undergo curing from the light emitter 40, the dichroic polymerization initiator absorbs the linearly polarized light for causing the photocurable resin RL to undergo curing, and thus the photocurable resin RL cures quickly. Then, a layer of the cured photocurable resin RS is formed on the surface 20a of the forming plate 20 positioned in region R3 (excluding region R4) having the strong transverse electric field.

Conversely, in region R4 near the surface of the alignment film 14 within region R1, since the anchoring force of the alignment film 14 is extremely strong, the dichroic polymerization initiator remains in the Y-direction aligned state even when photocurable resin RL is applied with the transverse electric field in the X direction and parallel to the bottom portion 12. Since the dichroic polymerization initiator aligned in the Y direction absorbs almost no linearly polarized light having a polarization direction in the X direction and for causing the photocurable resin RL to undergo curing, almost no cured photocurable resin RS is formed. Hence, the cured photocurable resin RS can be prevented or suppressed from adhering to the bottom portion 12. The thickness of region R4 which is near the surface of the alignment film 14 generally is less than or equal to 0.1 µm.

Referring back to FIG. 6, the controller 50 of the present embodiment controls the mover 30, the light emitter 40, and the appliers 70. The controller 50 of the present embodiment selects, based on the cross-sectional shape of the three-dimensional object Ob, appliers 70 of a region in which the photocurable resin RL corresponding to the cross-sectional shape of the three-dimensional object Ob is to undergo curing. The controller 50 of the present embodiment causes the selected appliers 70 to apply to the photocurable resin RL a transverse electric field parallel to the bottom portion 12. Other features of the controller 50 of the present embodiment are the same as the controller 50 of Embodiment 1.

Next, a method for forming the three-dimensional object Ob is described with reference to FIG. 12. Similar to that in Embodiment 1, the three-dimensional object Ob is formed by the stacking layers of the cured photocurable resin RS equal to n-layers by the optical forming device 100.

Figure 12:
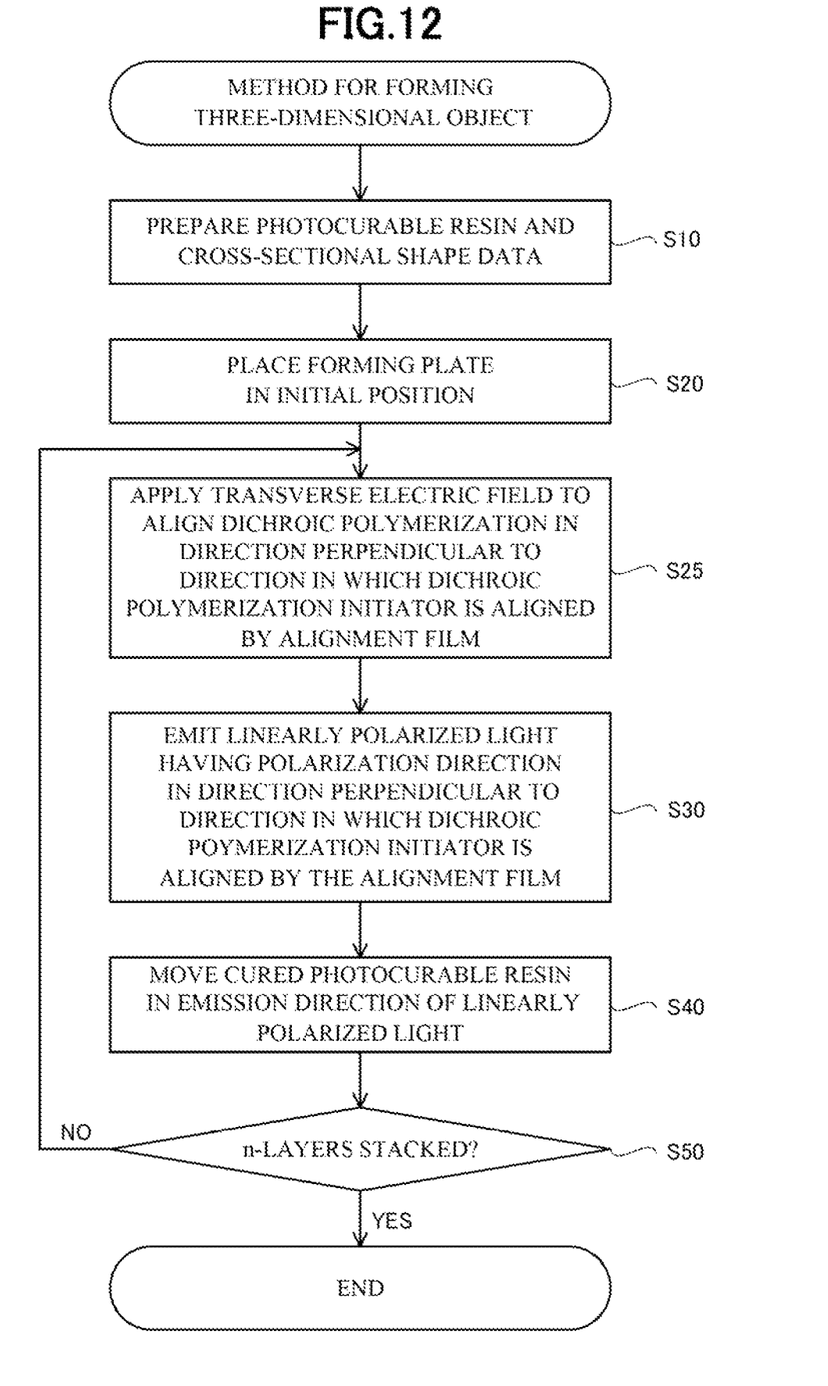
FIG. 12 is a flowchart illustrating a method for forming method a three-dimensional object according to Embodiment 2.

FIG. 12 is a flowchart illustrating the method for forming the three-dimensional object Ob of the present embodiment. The method for forming the three-dimensional object Ob of the present embodiment includes a step of preparing a photocurable resin RL and cross-sectional shape data (step S10), a step of placing the forming plate 20 at an initial position (step S20), a step of applying to a region of the photocurable resin RL, based on the cross-sectional shape of the three-dimensional object Ob, a transverse electric field, thereby aligning the dichroic polymerization initiator in a direction perpendicular to a direction in which the dichroic polymerization initiator is aligned by the alignment film 14 (step S25), a step of causing the photocurable resin RL to undergo curing by irradiating the photocurable resin RL with linearly polarized light having a polarization direction in a direction perpendicular to a direction in which the dichroic polymerization initiator is aligned by the alignment film 14 (step S30), a step of causing the cured photocurable resin RS to move in an emission direction of the linearly polarized light (step S40), and a step of determining whether or not the layers of the cured photocurable resin RS are equal to n-layers stacked (step S50). In the present embodiment, step S25 to step S40 are repeated.

Step S10 of the present embodiment is similar to step S10 of Embodiment 1. In the present embodiment, the photocurable resin RL is a UV curable-type resin. Also, the dichroic polymerization initiator included in the photocurable resin RL is aligned in the predetermined direction (Y direction) by the alignment film 14 in region R1 adjacent to the alignment film 14, that is, the region in which the anchoring force acts upon the molecules M therein.

In step S20, the forming plate 20 is moved by the mover 30, thereby placing the forming plate 20 in an initial position. Specifically, the surface 20a of the forming plate 20 is placed away from region R4, which is near the surface of the alignment film 14, to the +Z side (that is, region R3 excluding region R4 and having a strong electric field intensity) only by the thickness (predetermined interval worth) of a layer of the cured photocurable resin RS.

In step S25, appliers 70 within a region of the bottom portion 12 corresponding to the cross-sectional shape of the first layer, based on the cross-sectional shape data of the first layer, are selected. Then, a transverse electric field is applied by the selected appliers 70 to the photocurable resin RL. By doing so, the transverse electric field in the X direction and parallel to the bottom portion 12 is applied to a region of the photocurable resin RL based on the cross-sectional shape of the first layer of the three-dimensional object Ob, thereby aligning the dichroic polymerization initiator of region R3 having the strong electric field intensity (excluding region R4) in the X direction (that is, a direction perpendicular to the alignment direction by the alignment film 14).

In step S30, UV light is emitted from the light source 42 of the light emitter 40. Since the polarizing plate 46 of the light emitter 40 emits UV light emitted from the light source 42 as linearly polarized light having a polarization direction in the X direction, the photocurable resin RL is irradiated with linearly polarized light (UV light) having a polarization direction in the X direction. By doing so, in region R3 (excluding R4) having a strong electric field intensity within the region applied with the transverse electric field, the dichroic polymerization initiator aligned in the X direction by the transverse electric field absorbs the UV light, and thus the photocurable resin RL cures. Conversely, in region R4 that is near the surface of the alignment film 14 within the region applied with the transverse electric field, since the dichroic polymerization initiator aligned in Y direction absorbs almost no UV light, almost no cured photocurable resin RS is formed. Hence, cured photocurable resin RS can be prevented or suppressed from adhering to the bottom portion 12 with the forming method of the present embodiment.

Also, in the region not applied with the transverse electric field (that is, the region not corresponding to the cross-sectional shape of the first layer), since the dichroic polymerization initiator is aligned in the Y direction, almost no cured photocurable resin RS is formed even when the photocurable resin RL is irradiated with linearly polarized light (UV light) having a polarization direction in the X direction. Therefore, the first layer of cured photocurable resin RS is formed on the surface 20a of the forming plate 20.

In step S40, the cured photocurable resin RS (the forming plate 20) is moved by the mover 30, in the emission direction (+Z direction) of the linearly polarized light (UV light), equal to the thickness of the layer of the cured photocurable resin RS. In the present embodiment, since the cured photocurable resin RS is prevented or suppressed from adhering to the bottom portion 12, a step for removing the cured photocurable resin RS from the bottom portion 12 is unnecessary, and thus the throughput in manufacturing the three-dimensional object Ob can be improved.

In step S50, if the number of times step S30 is executed is less than n-times, a determination is made that the layers of the cured photocurable resin RS are not stacked equal to n-layers (NO in step S50). Upon determining that the layers of the cured photocurable resin RS are not stacked equal to n-layers (NO in step S50), the forming processing returns to step S25, and then a second or subsequent layer of the cured photocurable resin RS is formed. If the number of times S30 is executed is equal to n-times, a determination is made that the layers of the cured photocurable resin RS are stacked equal to n-layers (YES in step S50), and thus the forming processing ends. As described, the optical forming device 100 can form a three-dimensional object Ob. The cured photocurable resin RS contains a dichroic polymerization initiator aligned in a predetermined direction (X direction).

As described above, the optical forming device 100 of the present embodiment can prevent or suppress the cured photocurable resin from adhering to the bottom portion 12 because the optical forming device 100 irradiates the photocurable resin RL with linearly polarized light (light for causing the photocurable resin RL to undergo curing) having a polarization direction in a direction perpendicular to the alignment direction of the dichroic polymerization initiator by the alignment film 14 with the dichroic polymerization initiator in a state of being aligned, by the transverse electric field, in a direction perpendicular to the alignment direction by the alignment film 14. Furthermore, since the optical forming device 100 of the present embodiment can prevent or suppress the cured photocurable resin RS from adhering to the bottom portion 12, the throughput in forming the three-dimensional object Ob can be improved. The optical forming device 100 of the present embodiment is not provided with the optical modulator 44. Therefore, the optical forming device 100 that has a simple configuration in the present embodiment can form a three-dimensional object Ob.

Furthermore, since the optical forming device 100 of the present embodiment controls a region for causing the photocurable resin RL to undergo curing by the transverse electric field of the bottom portion 12 in contact with the photocurable resin RL, the resolution of the three-dimensional object Ob can be improved. The method for forming the three-dimensional object Ob of the present embodiment can prevent or suppress the cured photocurable resin RS from adhering to the bottom portion 12, and thus formation throughput can be improved.

Modified Example

The above-described embodiments can be modified in various manners without departing from the gist of the present disclosure.

For example, the bottom portion 12 of the resin tank 10 in Embodiments 1 and 2 is formed from a flat plate of glass. The bottom portion 12 of the resin tank 10 may be formed from a resin or a polymer film that enables light for causing the photocurable resin RL to undergo curing to pass therethrough.

The photocurable resin RL is not limited to a UV curable resin. The photocurable resin RL may be, for example, a resin that cures by being irradiated with visible light. Furthermore, the photocurable resin RL may include a polymerization inhibitor, metal nanoparticles, a pigment, and the like. The dielectric anisotropy of the dichroic polymerization initiator in Embodiment 2 may be negative. By applying a transverse electric field that is parallel to the alignment direction (Y direction) of the dichroic polymerization initiator by the alignment film 14, the dichroic polymerization initiator can be aligned in a direction (X direction) perpendicular to the alignment direction (Y direction) by the alignment film 14.

The alignment film 14 is not limited to a photoisomerization-type photoalignment film. The alignment film 14 may be, for example, a dissociation-type photoalignment film that utilizes photodissociation or a photodimerization-type photo-alignment film that utilizes the dimerization reaction. Also, the alignment film 14 may be a polyimide alignment film treated by rubbing processing.

Figure 13:
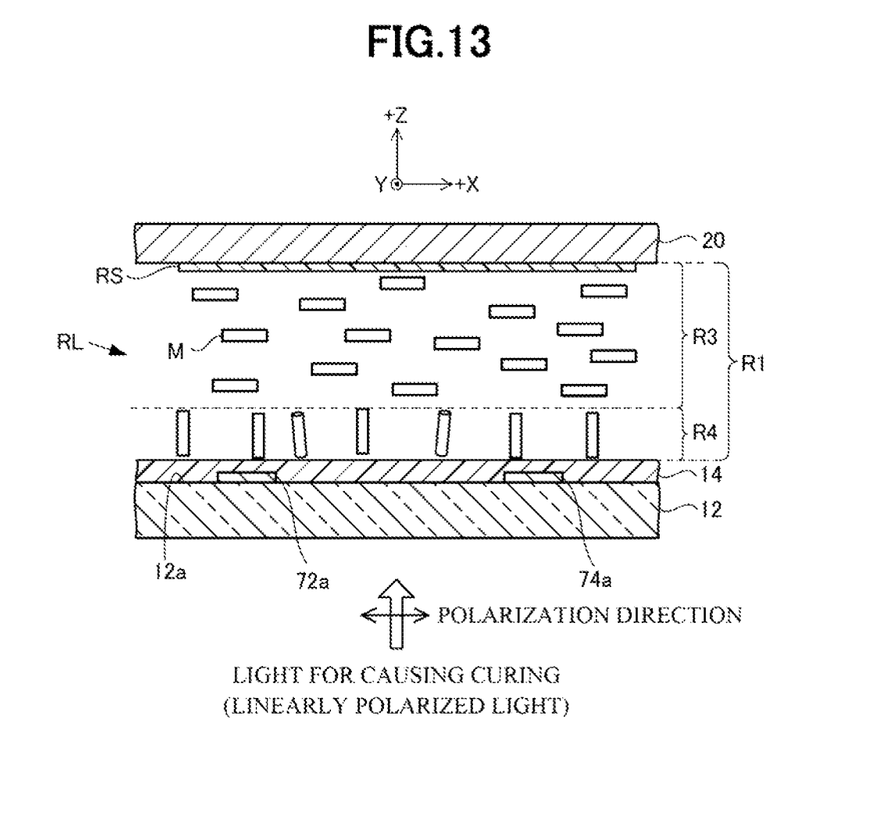
FIG. 13 is a schematic diagram for illustrating a photocurable resin in a state in which a transverse electric field is applied according to a modified example.

Furthermore, the alignment film 14 may be a vertical alignment film that aligns the dichroic polymerization initiator or the photocurable resin RL having liquid crystallinity in the vertical direction. For example, in a case where the alignment film 14 of the optical forming device 100 of Embodiment 2 is a vertical alignment film, the dichroic polymerization initiator of region R3 (excluding region R4) having a strong electric field intensity in the region applied with the transverse electric field is aligned in the X direction, whereas the dichroic polymerization initiator of region R4 near the surface of the alignment film 14 in the region applied with the transverse electric field is aligned in the Z direction, as illustrated in FIG. 13. Since the photocurable resin RL in such as state is irradiated with linearly polarized light (UV light) having a polarization direction in the X direction, the photocurable resin RL of region R3 (excluding region R4) having a strong electric field intensity cures, whereas the photocurable resin RL of region R4 that is near the surface of the alignment film 14 undergoes almost no curing. Hence, the cured photocurable resin RS can be prevented or suppressed from adhering to the bottom portion 12.

The light emitted from the light source 42 is not limited to UV light. The light source 42 emits light for causing the photocurable resin RL to undergo curing. The light source 42 may emit visible light in accordance with the wavelength at which the dichroic polymerization initiator generates active species. Alternatively, the light source 42 may be equipped with a lamp instead of the LED. Furthermore, the light source 42 may be equipped with a collimator that collimates light for causing the liquid photocurable resin RL to undergo curing, resulting in collimated light.

The optical modulator 44 is not limited to a TN-type liquid crystal device. The optical modulator 44 may be a vertical alignment (VA)-type liquid crystal device, a fringe-field switching (FFS)-type liquid crystal device, and the like. In addition to enabling light for causing the photocurable resin RL to undergo curing to pass therethrough or shielding such light from passing therethrough, the liquid crystal device 44 may modulated the amount of light, for causing to liquid photocurable resin RL to undergo curing, to be passed therethrough.

In Embodiments 1 and 2, the optical forming device 100 forms the three-dimensional object Ob by successively stacking the layers of the cured photocurable resin RS.

The optical forming device 100 may continuously form the three-dimensional object Ob by continuously irradiating the liquid photocurable resin RL with light for causing the liquid photocurable resin RL to undergo curing by the light emitter 40 while continuously moving the forming plate 20.

The foregoing describes some example embodiments for explanatory purposes.

Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-224423 filed on Dec. 12, 2019, the entire disclosure of which is incorporated by reference herein.

What is claimed is:
1. An optical forming device comprising:
a resin tank configured to retain a photocurable resin including a dichroic polymerization initiator;
a light emitter configured to irradiate the photocurable resin with light configured to cause the photocurable resin to undergo curing; and a forming plate upon which the cured photocurable resin is formed, the forming plate being positioned within the resin tank, wherein a bottom portion of the resin tank is provided with an alignment film configured to cause the dichroic polymerization initiator to align in a predetermined direction, and wherein the light emitter is configured to irradiate the photocurable resin with the light by passing the light through the bottom portion of the resin tank as linearly polarized light having a polarization direction in a direction perpendicular to a direction in which the dichroic polymerization initiator is aligned by the alignment film, thereby causing the photocurable resin to undergo the curing in a region that is not within reach of an anchoring force of the alignment film for causing the dichroic polymerization initiator to align in the predetermined direction, the region being between the forming plate and the bottom portion of the resin tank.

2. The optical forming device according to claim 1, wherein the light emitter includes:

a light source configured to emit the light; and an optical modulator configured to modulate the light emitted from the light source, the light being modulated to a pattern based on a cross-sectional shape of a three-dimensional object.

3. The optical forming device according to claim 1, wherein the alignment film is a horizontal alignment film.

4. The optical forming device according to claim 1, wherein the alignment film is a vertical alignment film.

5. The optical forming device according to claim 1, wherein the alignment film is a photoisomerized photoalignment film.

6. The optical forming device according to claim 1, wherein the dichroic polymerization initiator has liquid crystallinity.

7. The optical forming device according to claim 1, wherein the photocurable resin includes at least one of a liquid crystalline monomer or a liquid crystalline oligomer.

8. The optical forming device according to claim 1, wherein the light emitter is configured to irradiate the photocurable resin with the light by passing the light through the bottom portion of the resin tank as linearly polarized light having the polarization direction in the direction perpendicular to the direction in which the dichroic polymerization initiator is aligned by the alignment film, thereby causing the photocurable resin to undergo the curing in the region that is not within reach of the anchoring force of the alignment film for causing the dichroic polymerization initiator to align in the predetermined direction and in which the dichroic polymerization initiator faces random directions, the region being between the forming plate and the bottom portion of the resin tank.

9. An optical forming device comprising:

a resin tank configured to retain a photocurable resin including a dichroic polymerization initiator; and a light emitter configured to irradiate the photocurable resin with light configured to cause the photocurable resin to undergo curing, wherein a bottom portion of the resin tank is provided with an alignment film configured to cause the dichroic polymerization initiator to align in a predetermined direction, wherein the light emitter is configured to irradiate the photocurable resin with the light by passing the light through the bottom portion of the resin tank as linearly polarized light having a polarization direction in a direction perpendicular to a direction in which the dichroic polymerization initiator is aligned by the alignment film, wherein the bottom portion of the resin tank includes electrodes configured to apply to the photocurable resin a transverse electric field parallel to the bottom portion of the resin tank, and wherein the light emitter is configured to irradiate the photocurable resin with the linearly polarized light with the dichroic polymerization initiator in a state of being aligned in the direction perpendicular to the direction in which the dichroic polymerization initiator is aligned by the alignment film, by applying the transverse electric field to a region of the photocurable resin based on the cross-sectional shape of the three-dimensional object.

10. The optical forming device according to claim 9, further comprising:

a forming plate upon which the cured photocurable resin is formed, the forming plate being positioned within the resin tank, wherein the light emitter is configured to cause the photocurable resin to undergo the curing in a region in which the dichroic polymerization initiator is aligned by the transverse electric field in a direction perpendicular to the direction in which the dichroic polymerization initiator is aligned by the alignment film, the region being between the forming plate and the bottom portion of the resin tank.

* * * * *